United States Patent [19]

Ferguson

[11] 4,057,889

[45] Nov. 15, 1977

[54] ENGINE CYLINDER SLEEVE PULLER AND METHOD

[76] Inventor: Marvin D. Ferguson, R.R. 2, Box 258, Clayton, Ind. 46118

[21] Appl. No.: 668,727

[22] Filed: Mar. 19, 1976

[51] Int. Cl.[2] .................... B23P 19/02

[52] U.S. Cl. .................... 29/427; 29/266; 29/280

[58] Field of Search .................... 254/30; 29/258, 259, 29/263, 264, 265, 266, 282, 234, 427, 256, 280; 81/72

[56] References Cited

U.S. PATENT DOCUMENTS

| | | | |
|---|---|---|---|
| 1,126,612 | 1/1915 | Wright | 29/266 |
| 1,521,381 | 12/1924 | McPherson | 29/280 |
| 2,113,755 | 4/1938 | Billington | 29/256 |
| 2,421,324 | 5/1947 | Graham | 29/256 |
| 2,568,998 | 9/1951 | Fletcher | 29/266 |
| 3,479,722 | 11/1969 | Maness | 29/280 |

*Primary Examiner*—Lowell A. Larson

*Attorney, Agent, or Firm*—Woodard, Weikart, Emhardt & Naughton

[57] ABSTRACT

A puller supported atop the cylinder block has lugs or jaws engaging the underside of the cylinder wall ridge resulting from deposits of carbon and wear by piston rings, whereby screw force applied to the jaws through the puller is effective to pull the cylinder sleeve from the cylinder block. The piston is removed subsequently.

12 Claims, 4 Drawing Figures

ENGINE CYLINDER SLEEVE PULLER AND METHOD

BACKGROUND OF THE INVENTION

1. Field of the Invention

This invention relates generally to repair, maintenance, and rebuilding methods and tools for internal combustion engines, and more particularly to a puller and method of use thereof for removing removable sleeves from engine cylinder blocks.

2. Description of the Prior Art

Many reciprocating-type engines, and particularly internal combustion engines, having engine block construction which includes removable cylinder sleeves or liners. These are removable for replacement when worn. Replacement liners, complete with matching pistons, are subsequently installed.

In the normal course of use of an engine, the piston rings wear the walls of the cylinder. Eventually the walls become so worn as to require replacement of the cylinder liners. This requires removal of the cylinder liner and the piston. Due to the presence of the crankshaft, it is impossible to remove the pistons from most engines through the bottom of the cylinder. Yet the only cylinder liner pullers of which I am aware, require engagement of the jaws, lugs or hooks thereof with the bottom edge of the cylinder liner in order to install and use the puller. This necessitates removal of the piston.

Some U.S. patents on pullers designed for such use are as follows:

| | | |
|---|---|---|
| 2,421,324 | Graham | May 27, 1947 |
| 2,613,983 | Knudsen | October 14, 1952 |
| 2,650,419 | Barbisch | September 1, 1953 |
| 2,706,849 | Miller | April 26, 1955 |
| 2,715,261 | Williams | August 16, 1955 |
| 3,808,666 | Bales, Sr. | May 7, 1974 |

A patent on a device for pulling a sleeve by locating pins in holes in the sleeve is:

| | | |
|---|---|---|
| 3,805,359 | Webb | April 23, 1974 |

Some patents on devices for pulling pump liners or other sleeves are:

| | | |
|---|---|---|
| 2,487,902 | Stout et al | November 15, 1949 |
| 2,923,055 | Bradley, Jr. | February 2, 1960 |
| 3,055,093 | Ruble | September 25, 1962 |

A patent on a device useful as a gauge or as a puller for a bushing in a blind bore is:

| | | |
|---|---|---|
| 2,830,375 | Zwayer | April 15, 1958 |

Because of the ridge near the top of the cylinder liner in an engine, resulting from carbon deposits and from wear of the cylinder wall by the piston rings, it is impossible to remove the piston without first removing the ridge. This requires time and effort in using a ridge reamer or other ridge removing tool, before the piston can be removed.

It is an object of my invention to provide a method and means for removal of cylinder liners without the necessity of first removing the piston from the cylinder.

SUMMARY OF THE INVENTION

Described briefly, according to a typical embodiment of the present invention, after the cylinder head is removed from the cylinder block, and the cylinder is thereby exposed, the puller of the present invention is mounted atop the cylinder block over the cylinder. The work engaging jaws at the bottom of the puller operating draw bolt are spread to engage the wall of the cylinder liner immediately under the carbon and/or wear formed ridge, whereby abutting engagement is provided between upper face portions of the work engaging jaws, and the lower edge of the ridge. Then the bolt is turned to pull the work engaging jaws upward with respect to the cylinder block, whereupon the cylinder liner is pulled out of the block by the jaws. Then the piston can be pulled from the block.

DESCRIPTION OF THE PREFERRED EMBODIMENT

Figure 1:
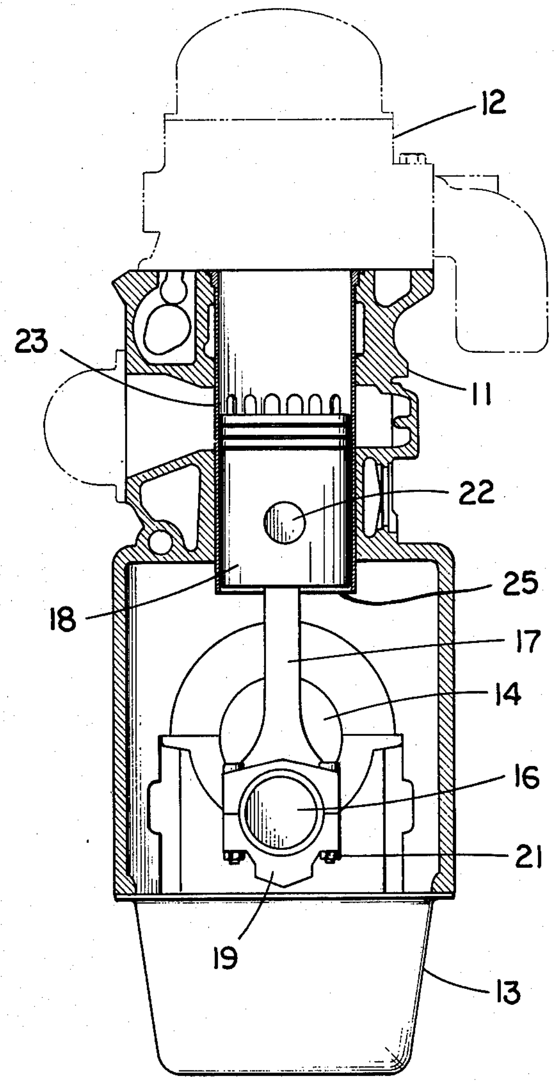
FIG. 1 is a cross section through the engine block and cylinder liner of a typical internal combustion engine, the section being shown schematically.

Referring now to the drawings in detail, and more particularly to FIG. 1, the engine comprises a cylinder block 11 having secured thereto a cylinder head 12 and an oil pan 13. A crankshaft 14 is mounted for rotation in the cylinder block and has connecting rod journals 16 offset from the rotational axis of the crankshaft to enable the connecting rod 17 driven by piston 18 to drive the crankshaft in rotation. The rod-bearing cap 19 secured to the rod by nuts 21 retains the connecting rod on the crankshaft. The piston is secured to the connecting rod by a piston pin 22.

Figure 2:
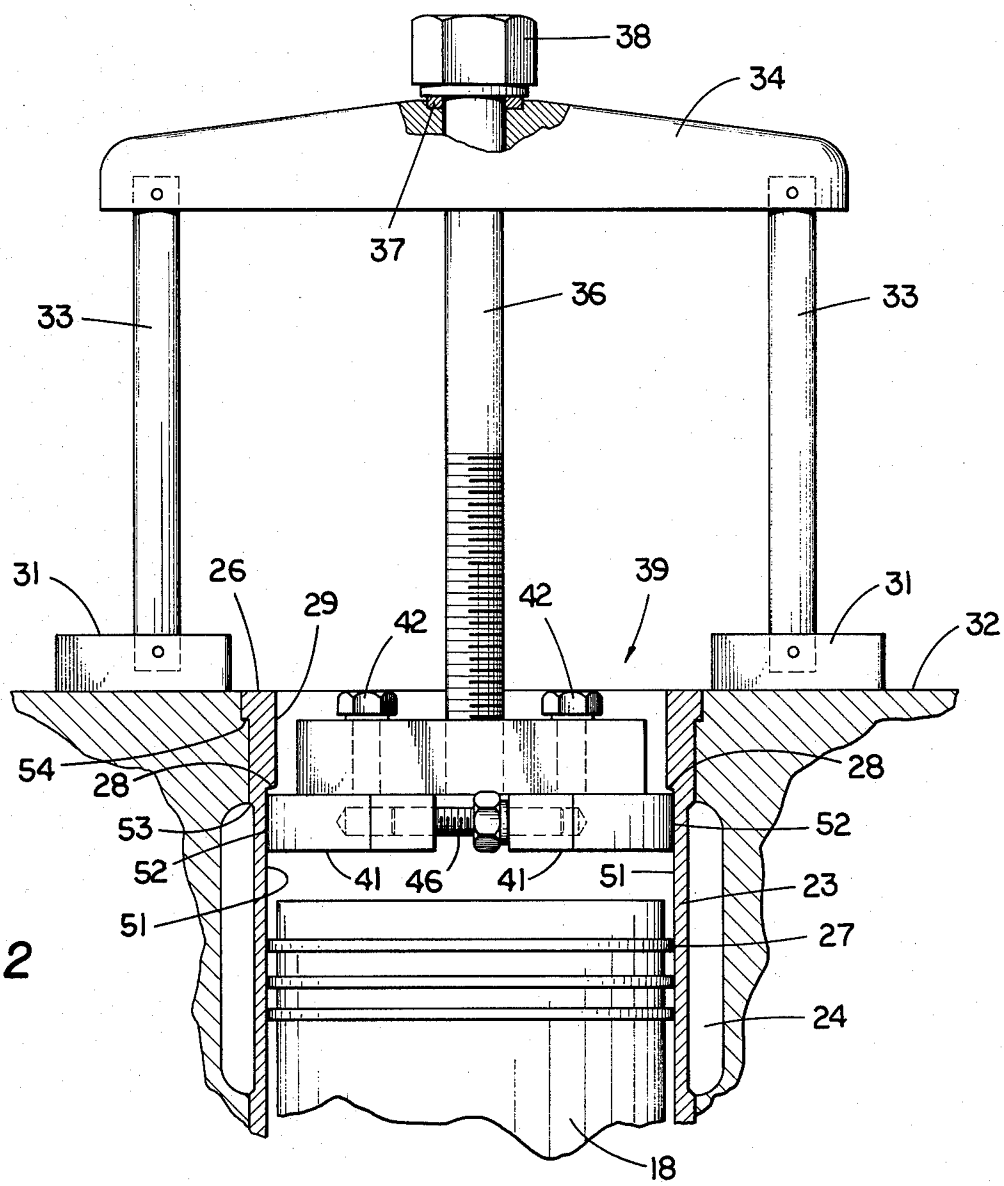
FIG. 2 is an enlarged fragmentary section showing the typical embodiment of the puller of the present invention installed in the cylinder with the piston in the cylinder.

The piston operates in a cylinder which, in the illustrated embodiment, comprises a sleeve or liner 23. This is actually a tube force-fitted into the cylinder block. In some instances, the tube is in contact with the cooling water, in which case it is usually referred to as a "wet sleeve." In other instances, it is not in direct contact with the coolant, but rather with a thin cylinder wall. In that event, it is referred to as a "dry sleeve." In either event, it is intended for removal and replacement with a matched tube and piston after it has become excessively worn. The wet sleeve is better shown in FIG. 2 at 23 where the coolant in gallery 24 is in direct contact with it. Originally, the inner cylindrical wall of the tube is truly cylindrical and smooth throughout its length from the top 26 to the bottom 25 (FIG. 1). Over a period of time, due to wear on the wall by the piston ring 27, it will become somewhat oval shaped near the upper limit of travel of the piston rings. In addition, above the upper limit of travel of the piston rings, there is sometimes an accumulation of carbon deposits. The result is that the inner, generally cylindrical surface has an interruption at the ridge 28 at the top of the upper piston ring travel. The inner, generally cylindrical surface of the tube at 29, above the ridge 28, will interfere with removal of the piston through the open top-end of the cylinder. The piston cannot be removed from the bottom of the cylinder, because there is not sufficient room in the crankcase between the crankshaft and the bottom of the cylinder in the cylinder block, to get the connecting rod and piston out. Therefore it is necessary to remove the piston from the top.

Heretofore it has been necessary to remove the ridge 28 formed by wear, deposits or both, before the piston could be removed. This was done by a ridge reamer, hone, or other tool, and required considerable time and effort. Following that, the piston and connecting rod were removed. After that, a puller was inserted into the cylinder, with the hooks or lugs thereof spread under the lower end of the sleeve, before the sleeve could be pulled out.

According to the present invention, as illustrated in a typical embodiment thereof, there is a puller provided with feet 31 supportable on the top 32 of the cylinder block, legs 33 rising from the feet, and the puller bar 34 supported atop the legs 33 and bridging the space over the cylinder.

A draw bolt 36 is received through the center of the beam or bridge bar 34 and a suitable thrust bearing 37 is provided under the hexagonal bolt head 38 and bears against a counterbore surface in the top of the bar 34. A jaw assembly 39 is mounted to the bottom of the draw bolt 36 and includes a pair of jaws 41 threadedly receiving a pair of cap screws 42 received in slots 43 in the "H" bar 44 threadedly received on the draw bolt 36 and serving as a nut. The screws 42 are tightened sufficiently to be snug against the top of the "H" bar, with the jaws snug against the bottom of the "H" bar.

Figure 4:
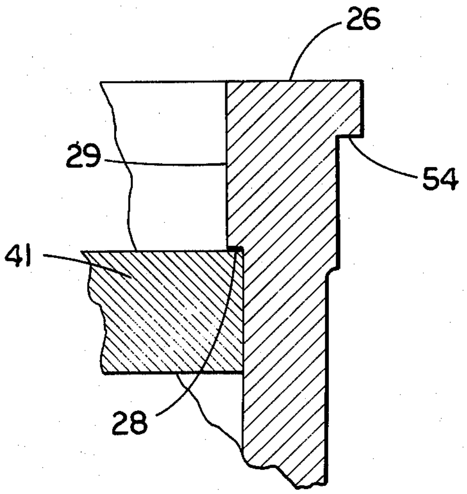
FIG. 4 is an enlarged fragmentary elevational view of the jaw engaging the ridge of the liner.

Spacer bolts or screws 46 are horizontally spaced on opposite sides of the draw bolt axis and each of these jaw spacer adjustment bolts 46 is threaded into one jaw and piloted in the other jaw as at 47 and 48, respectively, with the bolts on opposite sides of the draw bolt axis being threaded into opposite ones of the jaws. These adjustment bolts can be used to increase the spacing 49 between the jaws, from a minimum amount equal to the thickness of the hexagonal surface on the bolt, outward to a maximum determined by the ends of the threads on these adjustment bolts. In the embodiment illustrated, the adjustment screws have been used to expand the jaws out against the inner cylindrical wall at 51 so that the upper faces of the jaws are disposed immediately under and in abutting relationship with the underside of the ridge at 28, as is best shown in FIG. 4.

Figure 3:
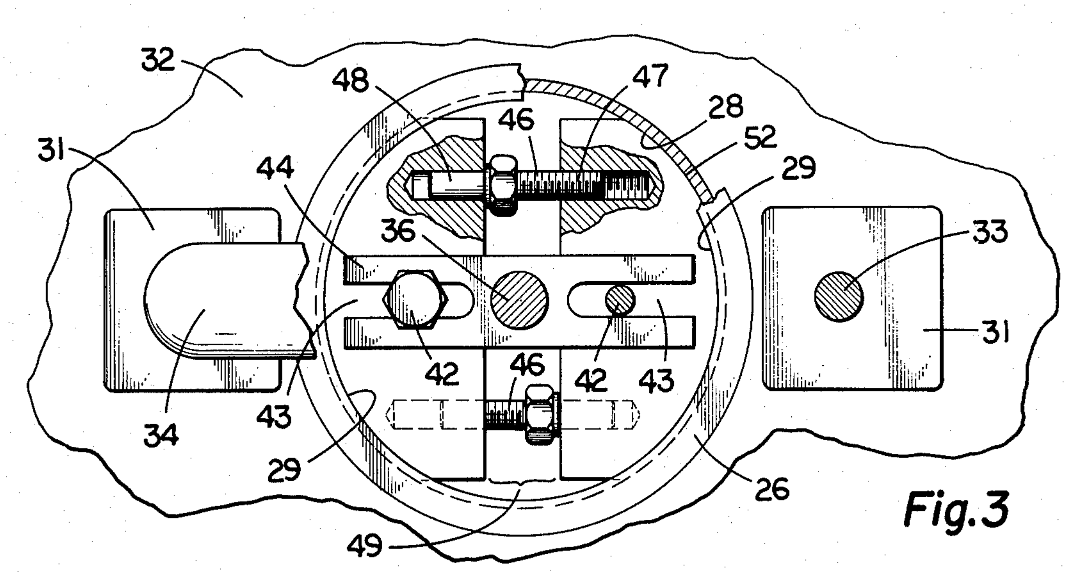
FIG. 3 is a top view, partially in section, and showing what the installation looks like from above as the puller is installed against the liner for pulling the liner from the cylinder block.

It may be found preferable to provide a slight oval shape to the wall-engaging faces 52 of the jaws, as the cylinder walls are sometimes worn in an oval fashion, and also to facilitate adaptation to a greater range of cylinder diameters. As can be seen in FIG. 3, the arcs of the jaws are greater than 90° each, and thus engage the underside of the ridge over a substantial area on both sides of the cylinder axis.

After the jaws are engaged with the walls under the ridges, and seated well, the head of the draw bolt is turned in a direction screwing the "H" bar up along the draw bolt. The sleeve is thereby pulled out of the cylinder block. As soon as the edge 53 of the sleeve reaches the level of the seat 54 in the cylinder block, it is possible that the sleeve may be pulled freely from the block. However, if lower portions of the sleeve are still in snug engagement with the block, the bolt can continue to be rotated until the sleeve has been pulled completely free of tight fitting engagement with the block. After that, and with the bearing cap on the connecting rod removed from the connecting rod, the piston and connecting rod can be pulled or pushed upward out of the top of the cylinder block as a unit.

In the use of the apparatus, the cylinder head is pulled from the block and the oil pan pulled from the block in the usual manner. The crankshaft may be rotated to lower the piston in the cylinder to receive attention first, so as to provide ample room for insertion of the puller. The bolts 46 are screwed into the respective jaws sufficiently to facilitate insertion of the jaw assembly through the top of the cylinder tube. Then they may be screwed out of the respective jaws to expand the jaws in diametrically opposite directions against the wall of the tube immediately under the ridge 28 so as to provide abutting engagement of the upper face of the jaw with the underside of the ridge. Then the screws 42 may be tightened slightly, if desired, the feet 31 placed immediately adjacent the liner but clear of it so it can be readily withdrawn, and the legs disposed upright and the draw bolt centered at the center line of the piston. Then the draw bolt can be turned to pull upwardly on the "H" bar to pull the sleeve from the cylinder block. If the sleeve is a wet sleeve, then the coolant should, of course, be drained from the cylinder block before pulling the sleeve. Following removal of the cylinder tube, the rod bearing cap may be detached and the piston and rod assembly pulled or pushed from below, out the top of the block.

In the foregoing description, it should be recognized that the puller can be used in virtually any attitude. That is to say that if the engine happens to be a horizontally opposed type, or if the block happens to be upside-down or in some attitude other than the usual attitude where the cylinder block is oriented with the heads generally on top of it, the tool can nevertheless be used.

Following removal of the one cylinder tube, succeeding cylinder tubes needing replacement, can be removed in like manner. In each instance it is likely that the crankshaft will be turned sufficiently to move the piston well below the ridge in the cylinder to facilitate installation of the jaw assembly of the puller.

The puller itself may be made of any material suitable for such purposes, steel appearing most likely except possibly for the draw bolt thrust bearing.

While there have been described above the principles of this invention in connection with specific apparatus, it is to be clearly understood that this description is made only by way of example and not as a limitation in the scope of the invention.

What is claimed is:

1. A method for removal of cylinder tubes from cylinder blocks comprising the steps of:

mounting a puller support on the cylinder block in registry with the open end of the cylinder tube;

forcibly and rigidly engaging diametrically opposite areas on the inner cylindrical surface of the cylinder tube above a piston therein with a pair of puller jaws, in an arc greater than 90° for each jaw, by applying force to said jaws in a direction radially outward with respect to the cylinder axis;

then applying a force in the direction of the cylinder axis only to the puller jaws through the puller support to force the jaws towards the support and thereby pull the cylinder tube outwardly of the cylinder block as the jaws remain forcibly and rigidly engaged with said areas, but without increasing radially outward directed force on said jaws.

2. The method of claim 1 and further comprising the steps of:

placing at least one of the jaws adjacent a shoulder on said surface immediately radially outside a wear ridge in said surface of the cylinder tube.

3. The method of claim 2 wherein the step of engaging the jaw with the ridge comprises:

abutting engagement of the lower face of the ridge with the upper face of the jaw as the upper face faces the support member of the puller.

4. The method of claim 3 and further comprising the steps of:

prior to mounting the puller support member, removing a cylinder head from the cylinder block; and prior to engagement of the shoulder, the step of moving the piston down in the cylinder tube away from the shoulder to provide space to admit the puller jaw.

5. The method of claim 2 comprising the step of:

turning a jaw expander bolt in the cylinder to spread the two jaws apart from one another diametrically of the cylinder to thereby forcibly and rigidly urge them diametrically outward against the inner cylindrical wall of the cylinder tube immediately under the ridge formed by wear of the cylinder tube.

6. The method of claim 1 and further comprising the step of:

pulling the tube from the block; and then pulling the piston from the hole in the block vacated by the tube.

7. A puller for cylinder sleeves comprising:

a drawbolt;

a bolt support member mountable over a cylinder opening;

a tube engaging member mountable in the cylinder tube and having two diametrically opposed jaws with arcuate wall-engaging outer surfaces on each jaw subtending arcs of at least 90° for each jaw, said jaws being engageable with an inwardly extending ridge in the tube for interference engagement therewith;

one of said members being threadedly received on the drawbolt to enable mechanically closing the space between said members by relative rotation between said one member and the drawbolt to forcibly pull the tube engaging member toward the support member and thereby pull the tube from the block, said tube engaging member including means operable independently of said drawbolt for moving said jaws radially outward and preventing inward movement with respect to a center line colinear with the axis of said bolt.

8. The puller of claim 7 wherein:

said tube engaging member includes an "H" bar having threads threadingly receiving the drawbolt, with said jaws being adjustably separable diametrically with respect to said center line for engaging opposite walls of a tube to be pulled from a block.

9. The puller of claim 8 and further comprising:

a pair of adjustment screws each having threads at one end and a pilot portion at the other end, the thread of one screw being threadedly received in one of said jaws and the thread of the other screw being threadedly received in the other of said jaws, said screws having pilot portions thereof opposite the threaded portions received in pilot holes of the jaws opposite those in which they are threadedly received.

10. The puller of claim 9 wherein said "H" bar includes a pair of aligned outwardly opening slots on opposite sides of the axis of the draw bolt, each slot receiving a cap screw securing the jaw member to the "H" bar.

11. The puller of claim 10 and further comprising:

a pair of feet mountable on opposite sides of the tube to be withdrawn, and atop the cylinder block;

a pair of legs secured in said feet and upstanding therefrom;

said support member being a bridging bar bridging the horizontal space between said legs and secured to the top of said legs, providing a support beam over the cylinder tube for the draw bolt.

12. The puller of claim 7 wherein said arcuate outer surfaces of said jaws are cylindrical faces subtending arcs of at least 120° for each jaw.

* * * * *